(12) United States Patent
Horiuchi et al.

(10) Patent No.: US 6,997,579 B2
(45) Date of Patent: Feb. 14, 2006

(54) LAMP WITH REFLECTING MIRROR AND IMAGE PROJECTING APPARATUS

(75) Inventors: Makoto Horiuchi, Nara (JP); Tsuyoshi Ichibakase, Osaka (JP); Tomoyuki Seki, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 133 days.

(21) Appl. No.: 10/685,961

(22) Filed: Oct. 15, 2003

(65) Prior Publication Data
US 2004/0085769 A1  May 6, 2004

(30) Foreign Application Priority Data
Oct. 22, 2002  (JP)  .............................. 2002-306831

(51) Int. Cl.
*F21V 7/00* (2006.01)
(52) U.S. Cl. ...................... 362/267; 362/262; 362/265; 313/113; 313/318.08
(58) Field of Classification Search ................ 362/267, 362/261, 262, 263, 265; 313/113, 318.11, 313/318.08, 110, 318
See application file for complete search history.

(56) References Cited

U.S. PATENT DOCUMENTS 6,849,993 B1 * 2/2005 Kai et al. .................... 313/113
2002/0025173 A1   2/2002 Isobe et al.

FOREIGN PATENT DOCUMENTS

JP   2001243919 A   9/2001
JP   2002006695 A   1/2002

* cited by examiner

*Primary Examiner*—Sandra O'Shea
*Assistant Examiner*—Guiyoung Lee
(74) *Attorney, Agent, or Firm*—Harness, Dickey & Pierce, P.L.C.

(57) ABSTRACT

A reflecting-mirror-equipped lamp 2000 is constituted by a high pressure discharge lamp 150 and a reflecting mirror 300. The reflecting mirror 300 includes a wide opening 310 and a narrow opening 320. A first sealing portion 101*a* of the high pressure discharge lamp 150 is fixed near the narrow portion 320 of the reflecting mirror 300, and provided with no base. A second sealing portion 101*b* of the high pressure discharge lamp 150 is provided at a side of the wide opening 310 of the reflecting mirror 300. An external lead 104 of the first sealing portion 101*a* and an outward-drawn lead wire 204*a* are joined to each other by the plastic flow of a caulking member 10.

13 Claims, 9 Drawing Sheets

LAMP WITH REFLECTING MIRROR AND IMAGE PROJECTING APPARATUS

BACKGROUND OF THE INVENTION

The present invention relates to lamps with reflecting mirrors and image projecting apparatus. In particular, the present invention relates to a lamp with a reflecting mirror used as a light source of a liquid crystal projector or a light source of image projecting apparatus such as a digital micromirror device (DMD) projector.

Image projecting apparatus such as liquid crystal projector devices are known as a means for magnifying and projecting images such as characters and figures to display the images. Such image display devices (or image projecting apparatus) need a predetermined optical output, so that reflecting-mirror-equipped lamps including high intensity discharge lamps (HID lamps) exhibiting high luminance are, in general, widely used as light sources. With widespread use of projectors, brighter and smaller projectors have been in demand.

FIG. 8 schematically shows a cross-sectional configuration of a prior art reflecting-mirror-equipped lamp 1000 for a projector. The reflecting-mirror-equipped lamp 1000 shown in FIG. 8 includes: a high pressure discharge lamp 1150; and a reflecting mirror 1300 provided with a front glass 1330. The high pressure discharge lamp 1150 is, for example, a high pressure mercury lamp operating with alternate current and includes: a luminous bulb 1100; and a pair of sealing portions 1101 respectively extending from both ends of the luminous bulb 1100. A luminous material (mercury) 1105 is enclosed in the luminous bulb 1100. A pair of opposed electrodes 1102 is placed in the luminous bulb 1100. The electrodes 1102 are connected to molybdenum foils 1103 located inside the respective sealing portions 1101. The molybdenum foils 1103 are connected to external leads 1104. The lamp 1150 equipped with the reflecting mirror 1300 is housed in a lamp house 1400, thereby constituting a lamp unit 1000.

One of the sealing portions 1101 of the lamp 1150 is equipped with a base 1200. The base 1200 is inserted into a neck portion 1306 of the reflecting mirror 1300 and fixed thereto with cement or the like. The base 1200 is electrically connected to one of the external leads 1104 extending from an end of the sealing portion 1101, so that an end of the base 1200 serves as a terminal LA of the high pressure discharge lamp 1150. The other external lead 1104 extending from the sealing portion 1101 located toward the wide opening of the reflecting mirror 1300 serves as a terminal LB of the high pressure discharge lamp 1150. The terminals LA and LB are joined to respective outward-drawn lead wires (cables) 1204a and 1204b by welding. The outward-drawn lead wires 1204a and 1204b are connected to a pin 1250 to be a terminal of the lamp unit 1500.

FIG. 9A is a perspective view schematically showing the lamp unit 1500 shown in FIG. 8. FIG. 9B is a cut-away perspective view schematically showing a projector body 1600 in which the lamp unit 1500 is placed. The configurations shown in FIGS. 8, 9A and 9B are disclosed in the prior art section in Japanese Laid-Open Publication No. 2002-6695.

As shown in FIG. 9B, the lamp unit 1500 is placed in the projector body 1600. Specifically, the pin 1250 provided on the lamp unit 1500 is inserted into a plug 1252 provided on the body 1600, and then a lid 1630 is attached to the body 1600. When the lamp unit 1500 is placed in the body 1600, the lamp unit 1500 is electrically connected to a ballast (not shown) provided within the body 1600. The ballast allows the lamp 1150 of the lamp unit 1500 to start and illuminate.

A cooling fan 1610 is provided at the rear of the lamp unit 1500 placed in the body 1600. An optical system using the lamp 1150 as its light source and a system (main system) for displaying an image by controlling the optical system are provided within the body 1600. Light emitted by the lamp 1150 passes through the optical system and a projecting lens 1620 and then is projected onto a screen where an image is produced.

As a projector is downsized and fabricated at lower cost, a reflecting-mirror-equipped lamp also needs to be downsized and fabricated at lower cost. Therefore, attempt has been made to produce the reflecting-mirror-equipped lamp with no base. The present inventors made a prototype of a reflecting-mirror-equipped lamp with no base and operated the lamp, to find that various problems arise or might arise. FIGS. 1A and 1B schematically show a configuration of the prototype of the reflecting-mirror-equipped lamp with no base made by the present inventors. FIG. 1A shows a reflecting-mirror-equipped lamp 1001 with no base. FIG. 1B shows a connection portion 20 in which an external lead 1104 and an outward-drawn lead wire 1204a are joined to each other, in an enlarged manner.

As shown in FIG. 1A, since the reflecting-mirror-equipped lamp 1101 has no base, the outward-drawn lead wire 1204a cannot be joined to a base by welding. In the example shown in FIG. 1B, the external lead 1104 and the outward-drawn lead wire 1204a are connected to each other via a nickel (Ni) sleeve 12 by welding. More specifically, the external lead 1104 is inserted into the Ni sleeve 12 so as to be in contact with the outer edge of the connection portion 20, and then the external lead 1104 and the Ni sleeve 12 are welded together at a relatively low temperature. Thereafter, the Ni sleeve 12 and the outward-drawn lead wire 1204a made of, for example, a Ni—Mn alloy are welded together, thereby the external lead 1104 and the outward-drawn lead wire 1204a are connected to each other. This technique is adopted because it is difficult to carry out a technique of wrapping the outward-drawn lead wire 1204a around the external lead 1104 or a technique of directly joining the outward-drawn lead wire 1204a and the external lead 1104 together by welding.

In the case of wrapping the outward-drawn lead wire 1204a around the external lead 1104, these components are not welded together. Accordingly, electrical connection (electrical continuity) between the outward-drawn lead wire 1204a and the external lead 1104 is incomplete. As a result, a discharge might occur at the connection portion 20, so that it is difficult to adopt the wrapping technique. In addition, molybdenum, which constitutes the external lead 1104, has a property of recrystallizing and becoming brittle under high temperatures, so that it is technically difficult to directly join the external lead 1104 and the outward-drawn lead wire 1204a to each other by welding. Therefore, a technique capable of welding the external lead 1104 and the outward-drawn lead wire 1204a together at low temperature, i.e., a technique of welding via the Ni sleeve, is adopted.

However, the Ni sleeve 12 and the outward-drawn lead wire 1204a are welded together by spot-welding, so that the contact area is small (almost a point contact). Accordingly, if a stress is applied to the outward-drawn lead wire 1204a, there arises a problem that the outward-drawn lead wire 1204a is easily detached from the connection portion 20. In particular, since the outward-drawn lead wire 1204a is exposed to the outside, the stress is easily applied thereto. As a result, the outward-drawn lead wire 1204a is often detached. In addition, the external lead 1104 and the Ni sleeve 12 are also welded together by spot-welding. Accordingly, if a stress is applied to the Ni sleeve 12 exposed to the outside, the Ni sleeve 12 is moved and detached from the welded portion. That is to say, the welding strength at the connection portion 20 is low, so that there is a problem that the welded portion is often separated by handling during assembly.

Furthermore, there found a problem that since the tips of the external lead 1104 and/or the outward-drawn lead wire 1204a are/is exposed to the outside because of the absence of a base as shown in FIG. 1B, the tip serves an antenna to generate a strong noise especially upon the application of a high-pressure pulse at the start of operation. In particular, a projector using a full digital device such as a DMD is vulnerable especially to noise, so that noise is a serious problem. In addition, since the tip of the wire is exposed to the outside, injury is likely to occur in replacing a lamp. Therefore, it is necessary to make a contrivance not to have users replace the lamp by themselves. With respect to the lamp unit, a configuration in which an opening of the lamp unit is made small so as to prevent a finger or the like from being easily inserted thereinto from the outside needs to be taken into consideration. However, such a configuration is disadvantageous especially for cooling in a lamp with a small reflecting mirror, resulting in another problem.

In addition, in the case of the lamp with a small reflecting mirror, the temperature at the neck portion 1306 is prone to increase, so that oxidation develops rapidly if the connection is made by welding. As a result, there arises a problem of a short lifetime. Now that the lifetime of lamps has been extended to, for example, 2000 hours or more thanks to the improvement of a fabrication technology or the like, it is necessary to eliminate shortening of the lifetime due to the reasons described above.

SUMMARY OF THE INVENTION

It is therefore an object of the present invention to produce a reflecting-mirror-equipped lamp capable of being downsized and fabricated at a lower cost as well as ensuring connection reliability.

An inventive reflecting-mirror-equipped lamp includes: a double end type high pressure discharge lamp including a luminous bulb enclosing a luminous material therein and first and second sealing portions respectively extending from both ends of the luminous bulb; and a reflecting mirror for reflecting light emitted from the high pressure discharge lamp, wherein the reflecting mirror includes a wide opening provided on a side of the reflecting mirror from which light is emitted and a narrow opening for fixing the high pressure discharge lamp, the first sealing portion of the high pressure discharge lamp is fixed near the narrow opening of the reflecting mirror, and no base is attached to the first sealing portion, the second sealing portion of the high pressure discharge lamp is disposed toward the wide opening of the reflecting mirror, the first sealing portion includes an external lead extending outward from the first sealing portion and exposed from the first sealing portion, and part of the external lead extending from the first sealing portion and an outward-drawn lead wire electrically connected to an external circuit are joined to each other by the plastic flow of a caulking member.

Another inventive reflecting-mirror-equipped lamp includes: a high pressure discharge lamp including a luminous bulb which encloses a luminous material therein and in which a pair of opposed electrodes is placed, and first and second sealing portions respectively extending from both ends of the luminous bulb; and a reflecting mirror for reflecting light emitted from the high pressure discharge lamp, wherein the reflecting mirror includes a wide opening provided on a side of the reflecting mirror from which light is emitted and a narrow opening for fixing the high pressure discharge lamp, the first sealing portion of the high pressure discharge lamp is fixed near the narrow opening of the reflecting mirror, and no base is attached to the first sealing portion, the second sealing portion of the high pressure discharge lamp is disposed toward the wide opening of the reflecting mirror, the first sealing portion seals a metal foil electrically connected to one of the electrodes at an end, and the other end of the metal foil is connected an external lead, part of the external lead is located inside the first sealing portion and the other part of the external lead extends outward from an end face of the first sealing portion, the part of the external lead extending from the first sealing portion and an outward-drawn lead wire electrically connected to an external circuit are joined to each other by the plastic flow of a caulking member, and part of the caulking member is buried in the first sealing portion.

In one preferred embodiment, the caulking member is placed outside a space defined by a reflecting surface of the reflecting mirror.

The caulking member is preferably surrounded and covered with cement.

Part of the first sealing portion may also be covered with the cement.

The discharge lamp is preferably a high pressure mercury lamp including mercury enclosed in an amount of 150 mg/cm$^3$ or more.

An inventive image projecting apparatus includes: the reflecting-mirror-equipped lamp; a lamp house for holding the reflecting-mirror-equipped lamp; and an optical system using the reflecting-mirror-equipped lamp as a light source.

In one preferred embodiment, a high-pressure pulse for starting the lamp is input to a terminal provided at the external lead extending from the first sealing portion of the reflecting-mirror-equipped lamp.

In one embodiment, the optical system includes a DMD.

In one embodiment, the high pressure discharge lamp is a lamp of 80 W or more and preferably 150 W or more.

In one embodiment, the reflecting surface of the reflecting mirror preferably has a maximum diameter of 45 mm or less. In one embodiment, a front glass is provided to the wide opening of the reflecting mirror. In one embodiment, the space surrounded by the reflecting mirror and the front glass preferably has an inner volume of 200 cm$^3$ or less.

In one embodiment, the caulking member has a cylindrical shape. In one embodiment, each of the pair of external leads is made of molybdenum, and the caulking member is made of a material more plastic than molybdenum constituting the external leads. The caulking member is preferably made of a material having excellent oxidation resistance.

DESCRIPTION OF THE PREFERRED EMBODIMENTS

Figure 1A:
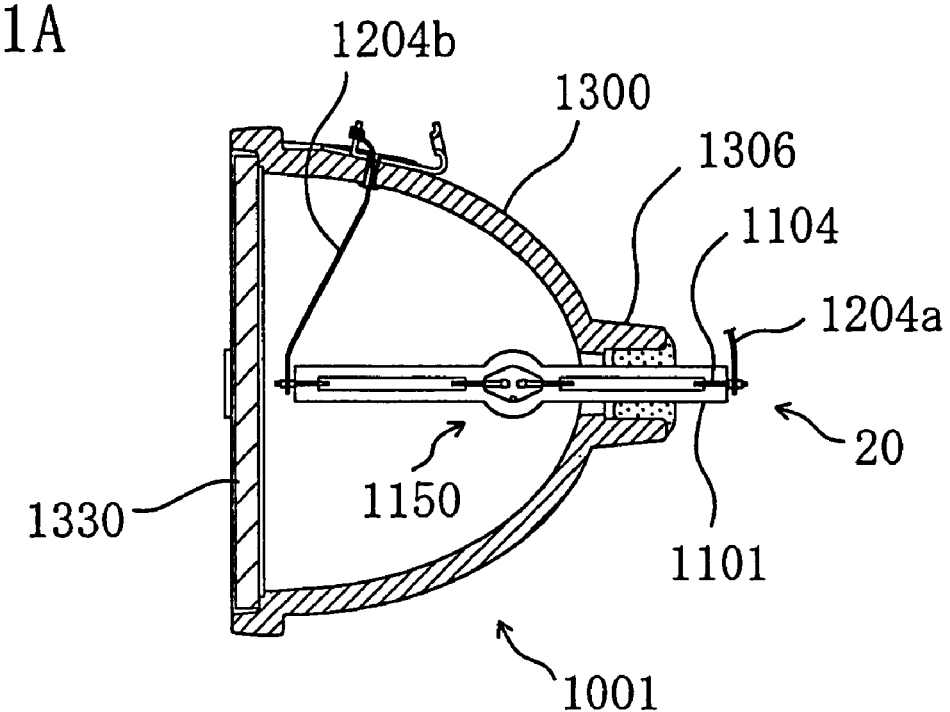
FIG. 1A is a view schematically showing a configuration of a reflecting-mirror-equipped lamp 1001 with no base.

Hereinafter, an embodiment of the present invention will be described with reference to the drawings. In the drawings, components having substantially the same function are identified by the same reference numeral for the sake of simplicity.

Figure 2:
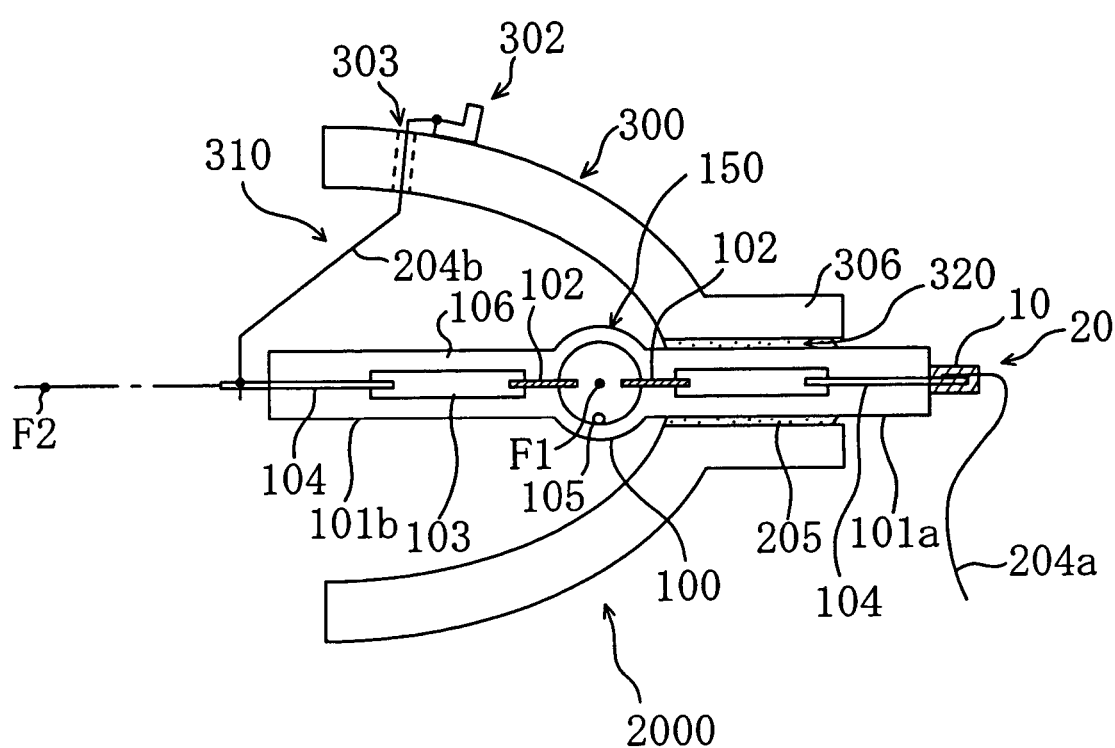
FIG. 2 is a view schematically showing a configuration of a reflecting-mirror-equipped lamp 2000 according to an embodiment of the present invention.

The embodiment of the present invention will be described with reference to FIGS. 2 and 3. FIG. 2 schematically shows a configuration of a reflecting-mirror-equipped lamp 2000 according to the embodiment.

The reflecting-mirror-equipped lamp 2000 of this embodiment is constituted by a high pressure discharge lamp 150 and a reflecting mirror 300. The high pressure discharge lamp 150 of this embodiment includes: a luminous bulb 100 enclosing a luminous material (e.g., mercury) 105 therein; and sealing portions 101a and 101b respectively extending from both ends of the luminous bulb 100. The high pressure discharge lamp 150 of this embodiment is a double-end type high-pressure mercury lamp and operates with alternating current.

The reflecting mirror 300 is configured to reflect light emitted from the high pressure discharge lamp 150. The reflecting mirror 300 of this embodiment is of an ellipsoidal mirror type and made of a heat-resistant glass whose inner surface is partly ellipsoidal. Points F1 and F2 in FIG. 2 are focal points.

The reflecting mirror 300 includes: a wide opening 310 provided on the side thereof from which light is emitted; and a narrow opening 320 for fixing the high pressure discharge lamp 150. The portion around the narrow opening 320 is a neck portion 306. The sealing portion 101a (first sealing portion) of the high pressure discharge lamp 150 is fixed near the narrow opening 320 of the reflecting mirror 300, and the sealing portion 101b (second sealing portion) of the high pressure discharge lamp 150 is disposed toward the wide opening 310 of the reflecting mirror 300. A small hole 303 for drawing an outward-drawn lead wire 204b electrically connected to the external lead 104 extending from the sealing portion 101b therethrough is provided in part of the reflecting mirror 300. A stainless hardware 302 is attached to the outer surface of the reflecting mirror 300. The outward-drawn lead wire 204b is electrically connected to this hardware 302.

In this embodiment, the sealing portion 101a is equipped with no base. The sealing portion 101a is fixed to the neck portion 306 of the reflecting mirror 300 with the heat-resistant cement 205. The external lead 104 extending from the sealing portion 101a is joined to an outward-drawn lead wire 204a by the plastic flow of a caulking member 10. As a result, the outward-drawn lead wire 204a is electrically connected to an external circuit (not shown). The external lead 104 is made of, for example, molybdenum, and the outward-drawn lead wires 204a and 204b are made of, for example, a Ni—Mn alloy.

Figure 3:
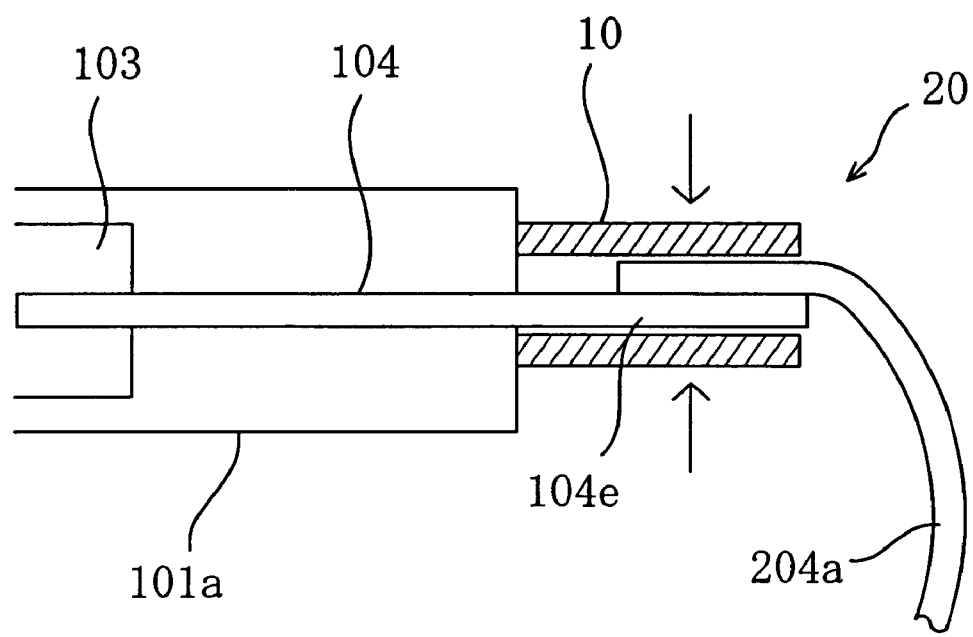
FIG. 3 is a view showing a connection portion 20 in an enlarged manner.

FIG. 3 shows a connection portion 20, e.g., a portion around the caulking member 10, in an enlarged manner. The caulking member 10 is disposed outside the space defined by the reflecting surface of the reflecting mirror 300.

As shown in FIG. 3, an exposed portion 104e of the external lead 104 extending outward from an end of the sealing portion 101a is joined to the outward-drawn lead wire 204a by the caulking member 10. In other words, the exposed portion 104e and the outward-drawn lead wire 204a are caulked by applying a stress (indicated by allows in FIG. 3) from the outside of the caulking member 10. Accordingly, the two members (104e and 204a) are joined not by welding, but by the plastic flow of the caulking member 10. The caulking member 10 is, for example, a sleeve having a cylindrical shape before the plastic deformation. In this embodiment, the cylindrical caulking member 10 having an inside diameter larger than the outside diameter of the external lead 104 is used.

Molybdenum constituting the external lead 104 is a material which is hardly deformed plastically, so that the caulking member 10 is preferably made of a material more plastic than molybdenum. Examples of such a material include Al, Cu, and Ni. Since the portion in which the caulking member 10 is located is a portion which readily gets hot because of contact resistance to current or heat generated from the lamp. Therefore, in order to improve the reliability of the lamp, the caulking member 10 is preferably made of a material having excellent oxidation resistance (e.g., Al).

The caulking member 10 has, for example, a cylindrical shape with an inside diameter of, e.g., 1.0 to 3.0 mm, an outside diameter of, e.g., 1.5 to 3.0 mm and a length of, e.g., 2.0 to 5.0 mm. In this embodiment, the outer lead 104 has an outside diameter of about 0.6 mm, and a cylindrical caulking member 40 (length in the longitudinal direction: about 3 mm) made of Al having an inside diameter of about 1.2 mm (thickness: about 0.2 mm) is used. Since it is sufficient to achieve joining with the plastic flow of the caulking member 10, the present invention is not limited to the cylindrical caulking member 10 used in this embodiment, but a U-shaped caulking member or a double-plate caulking member, for example, may be used.

In the discharge lamp 150 of this embodiment, the external lead 104 and the outside-drawn lead wire 204a are joined to each other by the plastic flow of the caulking member 10, so that the external lead 104 and the outside-drawn lead wire 204a are in contact with each other at many points to be electrically connected to each other. Therefore, even in a reflecting-mirror-equipped lamp with no base, the reliability of connection between the external lead 104 and the outside-drawn lead wire 204a is improved. That is to say, the reflecting-mirror-equipped lamp 2000 of this embodiment is configured to have a higher mechanical strength at the connection portion 20 than in a configuration in which the external lead 1104 is in contact with the Ni sleeve 12 at one point and the Ni sleeve 12 is in contact with the outside-drawn lead wire 1204a at one point.

Figure 1B:
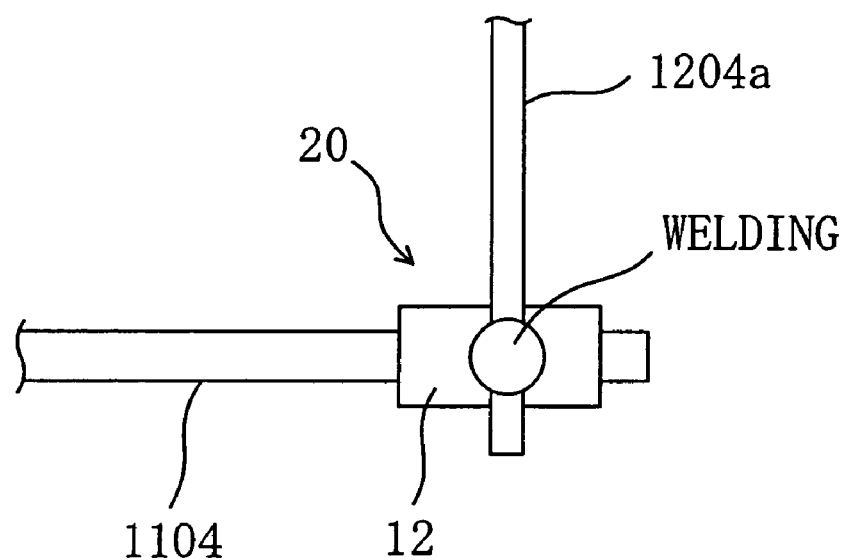
FIG. 1B is a view showing a connection portion 20 in an enlarged manner.

In addition, since the external lead 104 and the outside-drawn lead wire 204a are in contact with each other at many points in this embodiment, the contact resistance between the external lead 104 and the outside-drawn lead wire 204a can be reduced as compared to the configuration shown in FIG. 1. Accordingly, the temperature in the connection portion 20 can be reduced during lamp operation, thus also improving the reliability of the lamp. Furthermore, since the external lead 104 and the outside-drawn lead wire 204a are joined together firmly by the plastic flow of the caulking member 10, there occurs no incomplete electrical connection (electrical continuity) between the outside-drawn lead wire 204a and the external lead 104, unlike the technique of wrapping the outward-drawn lead wire around the external lead. It should be noted that the connection reliability is ensured to some extent in advance in the configuration of this embodiment, so that the fabrication process can be carried out without inspecting whether or not the electrical connection is good, which is performed during joining by welding. As a result, the production cost can be reduced.

Moreover, the tip of the external lead 104 and the tip of the outward-drawn lead wire 204a are placed within the caulking member 10 in advance, so that it is possible to prevent exposure of the tips. Accordingly, it is possible to prevent the tips from acting as antennas, so that the influence of noise occurring during application of a high-pressure pulse can be reduced. This effect is remarkable particularly in the case where a DMD is included in an optical system in an image projecting apparatus. With the configuration in which the tips of the leads are not exposed to the outside, injury from the tips can be prevented. As a result, it is unnecessary to have a configuration disadvantageous for cooling in order to prevent the injury. In addition, connection by welding is also unnecessary, so that the external lead 104 is less likely to be oxidized. It is of course that since no base is used, the reflecting-mirror-equipped lamp can be downsized and the production cost thereof can be reduced.

Now, the configuration of the reflecting-mirror-equipped lamp 2000 of this embodiment will be described in detail. The luminous bulb 100 of the lamp 150 is substantially spherical and made of quartz glass. To achieve a high pressure mercury lamp (in particular, an extra-high pressure mercury lamp) exhibiting excellent characteristics such as a long lifetime, high purity quartz glass having a low level of alkali metal impurities (e.g., the mass of each type of alkali metal is 1 ppm or less) is preferably used as the quartz glass constituting the luminous bulb 100. It is of course possible to use quartz glass having a regular level of alkali metal impurities. The outside diameter of the luminous bulb 100 is, for example, about 5 mm to 20 mm, and the glass thickness of the luminous bulb 100 is, for example, about 1 mm to 5 mm. The volume of the discharge space in the luminous bulb 100 is, for example, about 0.01 to 1 cc (i.e., 0.01 to 1 cm$^3$). In this embodiment, the luminous bulb 100 has an outside diameter of about 9 mm, an inside diameter of about 4 mm and a volume of the discharge space of about 0.06 cc.

A pair of opposed electrodes (electrode rods) 102 is disposed in the luminous bulb 100. The heads of the electrodes 102 are arranged in the luminous bulb 100 with a distance (arc length) D of about 0.2 to 5 mm (e.g., 0.6 to 1.0 mm) therebetween, and each of the electrodes 102 is made of tungsten (W). It is preferable to wind a coil (e.g., a coil made of tungsten) around the heads of the electrodes 102 for the purpose of reducing the temperature of the electrode heads during lamp operation.

The sealing portions 101a and 101b include: metal foils 103 electrically connected to the respective electrodes 102; and glass portions 106 extending from the luminous bulb 100. The airtightness of the discharge space in the luminous bulb 100 is maintained by sealing the metal foils 103 with the glass portions 106. The glass portions 106 of the sealing portions 101a and 101b are made of, for example, quartz glass. Each of the metal foils 103 is, for example, a molybdenum foil (Mo foil) and has, for example, a rectangular shape. If the sealing portions 101a and 101b are formed by a shrinkage technique, the portions 101a and 101b have a substantially circular shape in cross section, and the metal foils 103 are positioned at the respective center portions of the sealing portions 101a and 101b.

In the luminous bulb 100, mercury is enclosed as a luminous material 105. When the lamp 150 is operated as an extra-high pressure mercury lamp, for example, mercury in an amount of about 150 mg/cc or more (150 to 200 mg/cc or more), a rare gas at 5 to 30 kPa (e.g., argon), and a small amount of halogen, if necessary, are enclosed in the luminous bulb 100.

The halogen enclosed in the luminous bulb 100 serves for a halogen cycle that returns tungsten (W) that has evaporated from the electrodes 102 during lamp operation to the electrodes 102, and is, for example, bromine. The halogen to be enclosed may be in the form of a single substance or in the form of a halogen precursor (form of a compound). In this embodiment, halogen in the form of $CH_2Br_2$ is introduced into the luminous bulb 100. The amount of $CH_2Br_2$ enclosed in this embodiment is about 0.0017 to 0.17 mg/cc, and this corresponds to about 0.01 to 1 $\mu$mol/cc when expressed by a halogen atom density during lamp operation. The strength against pressure (operating pressure) of the lamp 150 is 15 to 20 MPa or more. The rated power is, for example, 80 W or more, and is preferably 150 W (which corresponds to a load at the bulb wall of about 130 W/cm$^2$) or more if the characteristic of high output is to be remarkable. The load at the bulb wall is, for example, about 130 W/cm$^2$ or more, and the upper limit is not particularly set. For example, a lamp having a load at the bulb wall in the range from about 130 W/cm$^2$ or more to about 300 W/cm$^2$ (preferably about 130 to 200 W/cm$^2$) can be achieved. In this embodiment, if a cooling means is provided, it is possible to achieve a load at a wall bulb of about 300 W/cm$^2$ or more.

The maximum diameter of the reflecting surface of the reflecting mirror 300 is preferably 45 mm or less, and is more preferably 40 mm or less in order to satisfy a demand for further compactness. The reflecting mirror 300 can be of an airtight structure by attaching a front glass to the wide opening 310 of the reflecting mirror 300. The inner volume of the reflecting mirror 300 is preferably 200 cm$^3$ or less. For example, with respect to the reflecting mirror 300 of this embodiment and its focal point, the diameter φ of the wide opening 310 is about 45 mm, and the depth Dr of the reflecting mirror 300 is about 33 mm. The distance from the deepest portion of the reflecting mirror 300 to the focal points F1 and F2 are about 8 mm and about 64 mm, respectively. The volume of the reflecting mirror 300 is about 40000 mm$^3$, i.e., about 40 cc.

Figure 4:
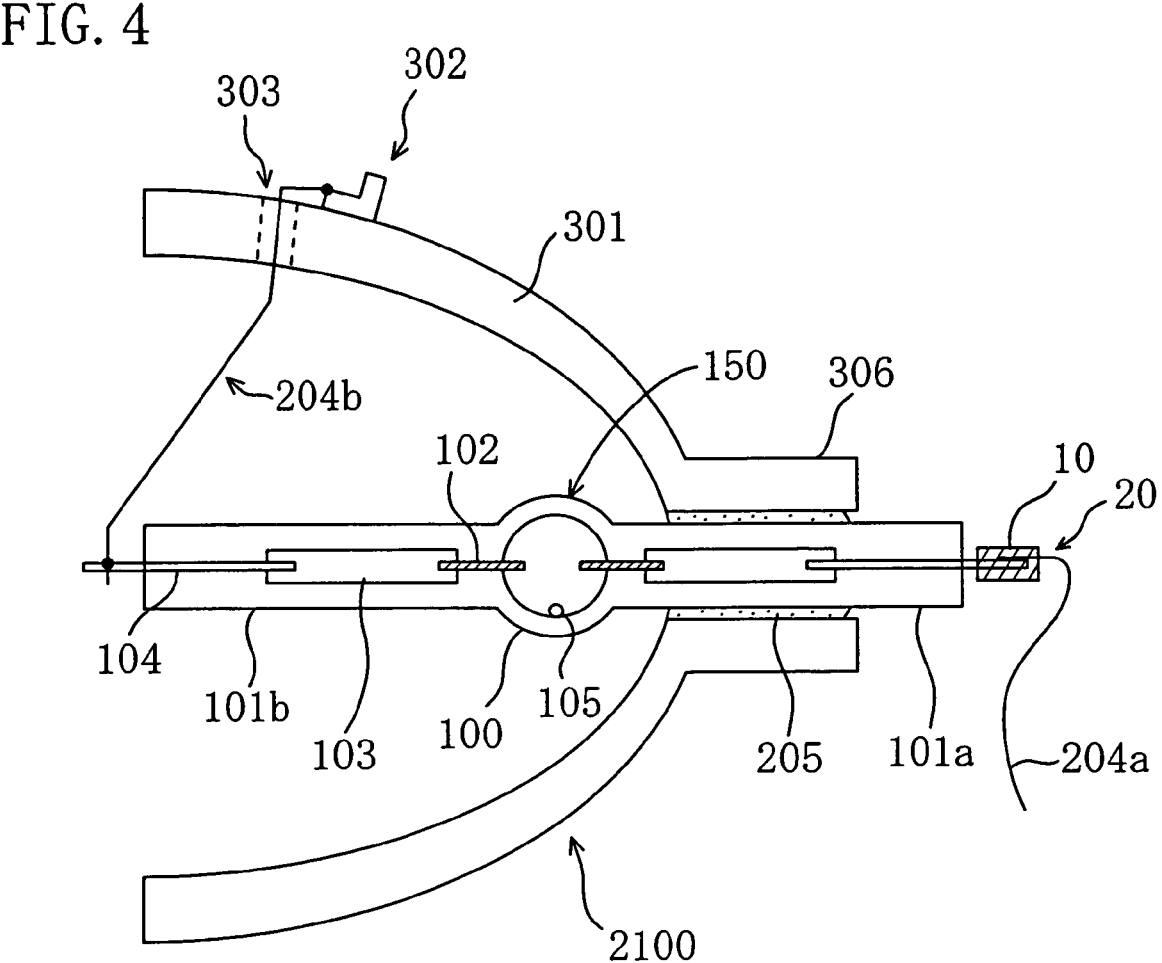
FIG. 4 is a view schematically showing a configuration of a reflecting-mirror-equipped lamp 2100 according to an embodiment of the present invention.

Instead of the ellipsoidal reflecting mirror 300, a parabolic reflecting mirror 301 whose inner surface is partially parabolic as shown in FIG. 4 may be used. The caulking member 10 may be made in contact with an end face of the sealing portion 101a as shown in FIG. 2, or may be separated from the end face of the sealing portion 101a as shown in FIG. 4.

Figure 5:
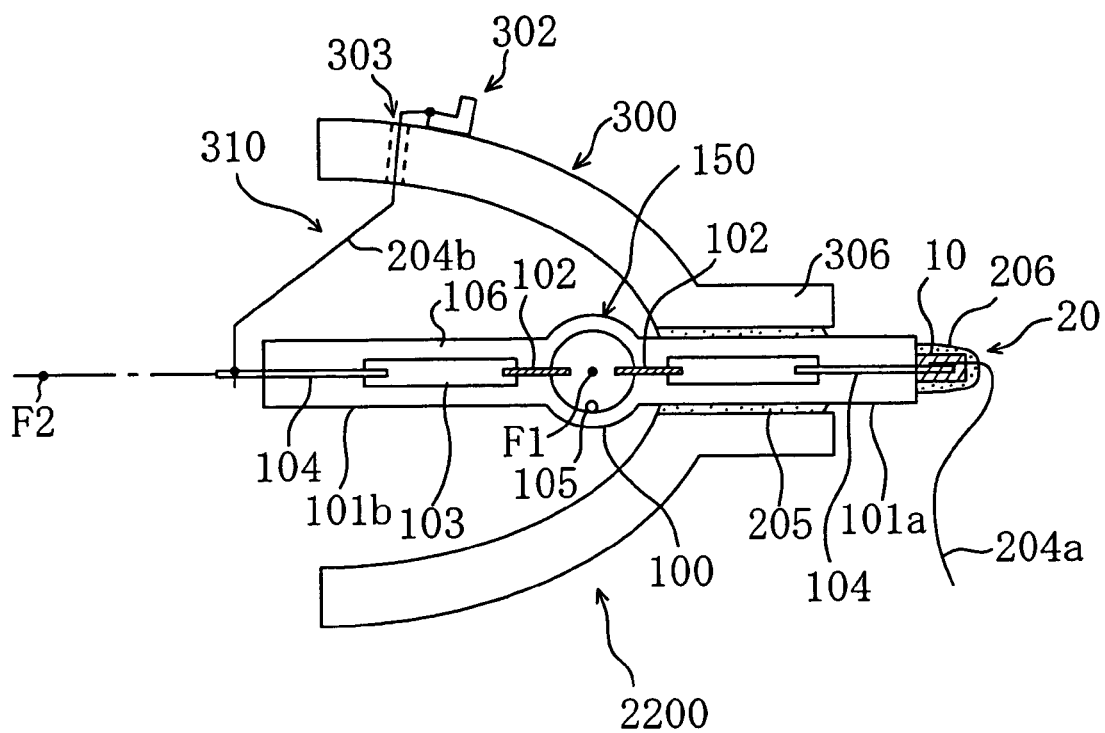
FIG. 5 is a view schematically showing a configuration of a reflecting-mirror-equipped lamp 2200 according to an embodiment of the present invention.

Alternatively, as shown in FIG. 5, it is also preferable to surround and cover the caulking member 10 with cement 206. If the caulking member 10 is thus covered with cement, heat resistance can be improved. In addition, the strength of the connection portion 20 can be increased.

Figure 6:
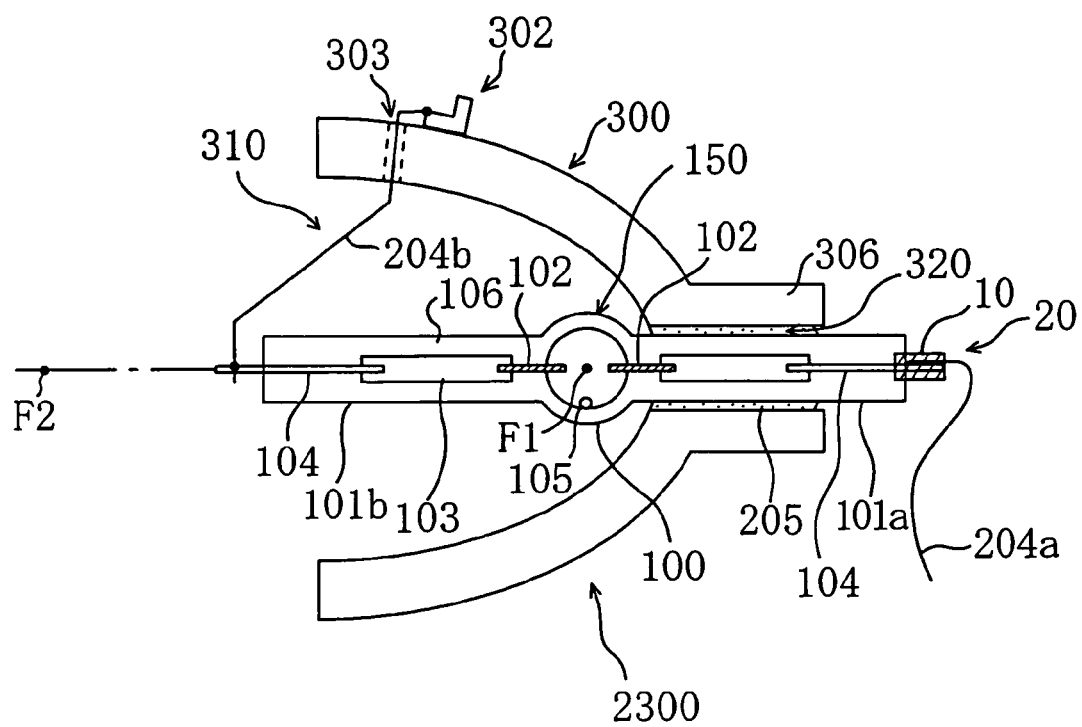
FIG. 6 is a view schematically showing a configuration of a reflecting-mirror-equipped lamp 2300 according to an embodiment of the present invention.

Alternatively, as shown in FIG. 6, the caulking member 10 may be partly buried in the sealing portion 101a. Then, the caulking member 10 is fixed with the sealing portion 101a, thus further increasing the strength of the connection portion 20. Since the caulking member 10 is partly located inside the sealing portion 101a, the external lead 104 inside the sealing portion 101a can be protected. Alternatively, such a caulking member 10 as covering the whole of the external lead 104 inside the sealing portion 101a may be used. In a configuration shown in FIG. 6, it is also possible to surround and cover the caulking member 10 with cement. Then, the heat resistance can be improved, for example.

In order to form the configuration shown in FIG. 6, it is sufficient that in sealing a side tube portion of a glass tube prepared in a fabrication process step, part of the caulking member 10 is inserted into the side tube portion so that a sealing process (shrinking process or pinching process) is performed in the same state.

Figure 7A:
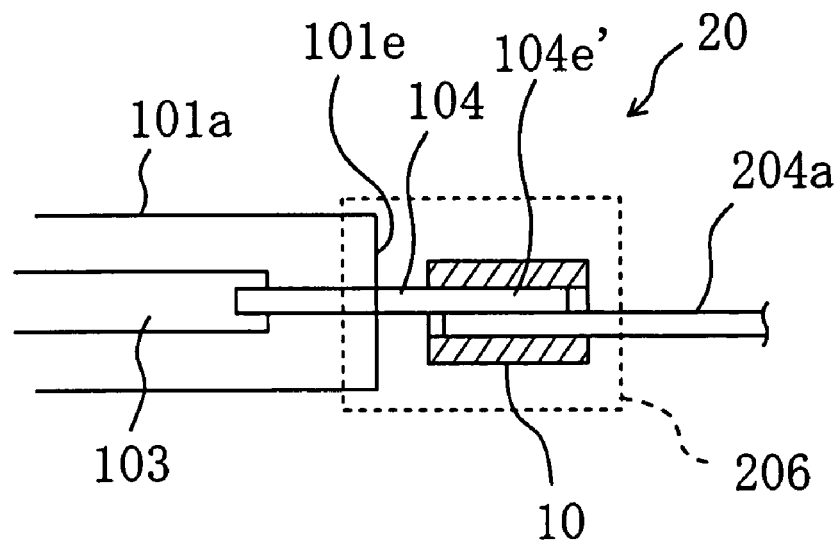
FIGS. 7A and 7B are views showing a connection portion 20 in an enlarged manner.
Figure 7B:
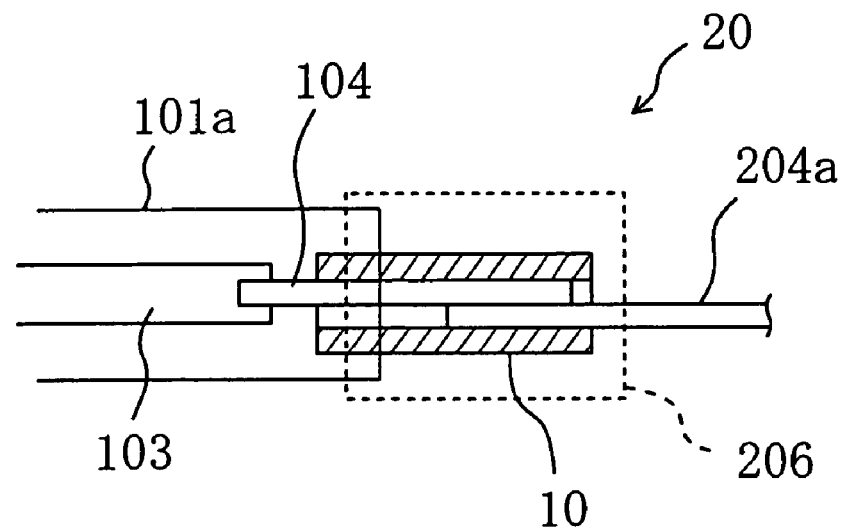

Now, the configuration shown in FIGS. 2 and 3 and the configuration shown in FIG. 6 are respectively shown in FIGS. 7A and 7B in an enlarged manner. FIG. 7A shows a configuration in which the caulking member 10 is placed near the sealing portion 101a. Provision of cement in an area surrounded by the dotted line (206) improves heat resistance. The caulking member 10 may be in contact with an end face 101e of the sealing portion 101a as described above. In the case of a configuration in which the caulking member 10 is in contact with the end face 101e (see FIG. 2), the following advantage is effectively achieved. The advantage is prevention/suppression of breakage of the external lead 104 due to increase in heat capacity, i.e., a so-called creep phenomenon caused by the caulking member 10. Specifically, expansion and contraction of the external lead 104 are repeatedly caused by heat generated in accordance with turning on and off of the lamp. However, if the caulking member 10 is provided, the apparent heat capacity of the external lead increases, thus suppressing the expansion and contraction accordingly. As a result, breakage due to the creep phenomenon is prevented. In order to prevent the breakage due to the creep phenomenon in an external lead root portion 104e' extending and exposed from the sealing portion 101a and not covered with the caulking member 10, the caulking member 10 is preferably in contact with the end face 101e of the sealing portion 101a. Likewise, in the configuration shown in FIG. 7B, the advantage of preventing the breakage due to the creep phenomenon is also obtained.

Now, an advantage obtained with the configuration including no base will be described. As described above, the use of the caulking member 10 can achieve compactness and a low production cost as well as connection reliability in a reflecting-mirror-equipped lamp. In addition, the configuration with no base also has another advantage.

Figure 8:
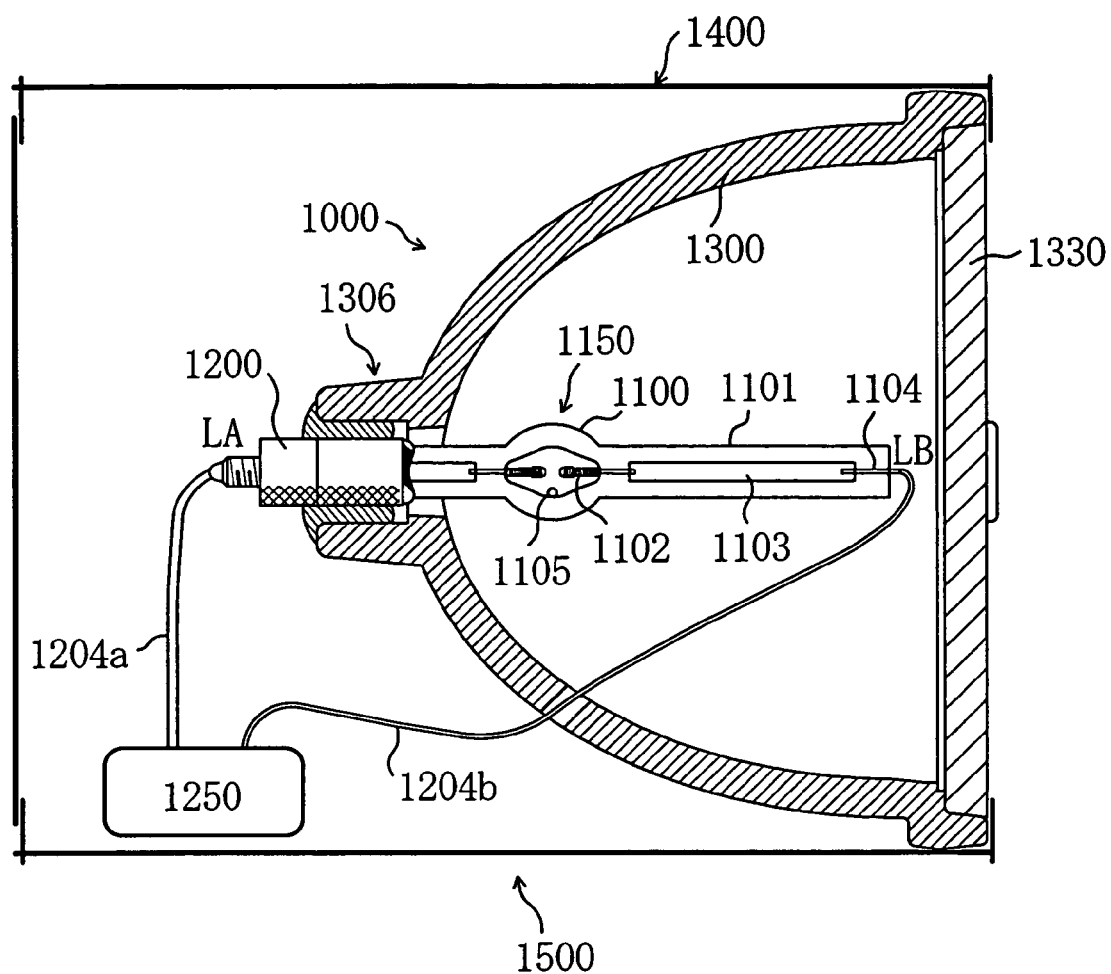
FIG. 8 is a view schematically showing a configuration of a prior art lamp unit 1500.

In the configuration including a base shown in FIG. 8, the start ability in the case where a high-pressure pulse is applied to the terminal LB is better than in the case where a high-pressure pulse is applied to the terminal LA. Accordingly, in terms of the start ability, a high-pressure pulse is preferably applied to the terminal LB. The high-pressure pulse is a pulse for starting a high pressure discharge lamp at a voltage of, for example, 1 kV or more and 10 to 15 kV in the case of a typical lamp and a voltage of 5 kV or less (e.g., 2 to 5 kV) in the case of a low-stating-voltage type lamp.

Although the application to the terminal LB is preferable in terms of the start ability, application to the terminal LA is more preferable in terms of design. Specifically, application of a high-pressure pulse requires some insulating distance for safety. Considering the distance from the lamp house, compactness is not achieved so much in the case of application to the terminal LB. On the other hand, if the application to the terminal LA is possible, a relatively large space is secured, so that the distance from the lamp house is more easily secured, resulting in easiness in designing for compactness.

The present inventors conducted an experiment in which a high-pressure pulse is applied to the terminal LA, to find that a voltage was detected at the reflecting mirror 1300. In addition, it was found that the voltage value at the reflecting mirror 1300 was lager than the value detected at the terminal LB. That is to say, it was found that the high-pressure pulse was leaked into the reflecting mirror 1300. This is the reason why the start ability is worse in the case of application to the terminal LA. A study on a cause of the leakage into the reflecting mirror 1300 shows that a parasitic capacitance is created between the metal base 1200 and the reflecting mirror 1300 to cause capacitive coupling therebetween so that the high-pressure pulse is leaked into the reflecting mirror 1300. Since the reflecting-mirror-equipped lamp of this embodiment uses no base, it is possible to prevent the leakage of the high-pressure pulse into the reflecting mirror, so that it is possible to apply a high-pressure pulse to the terminal LA. As a result, a reflecting-mirror-equipped lamp suitable for a compact design can be achieved as well as compactness of a lamp unit and image projecting apparatus can be achieved.

In the above embodiment, the present invention has been described with respect to the preferred embodiment. However, the present invention is not limited to this embodiment and, of course, various modification can be applied.

In the above embodiment, a high pressure mercury lamp has been described as an example of a lamp. However, this is only a preferred example and the lamp may be a xenon lamp or a metal halide lamp (including mercury-free metal halide lamps). Furthermore, in the embodiment, high pressure mercury lamps including mercury enclosed in an amount of 150 mg/cm$^3$ or more (so-called extra-high pressure mercury lamps) have been described, but the present invention may be applied to high pressure mercury lamps including mercury enclosed in amounts of less than that. In the embodiment, the alternating current operation type lamp has been described, but the present invention is not limited to the embodiment and may be applied to any of an alternating current operation type and a direct current operation type. In addition, the distance (arc length) between the pair of electrodes 102 may be a distance of a short arc type (e.g., 2 mm or less) or may be longer than that. A caulking member may be used for connection between the external lead 104 extending from the sealing portion 101b of the lamp 150 and the outward-drawn lead wire 204b.

Figure 9A:
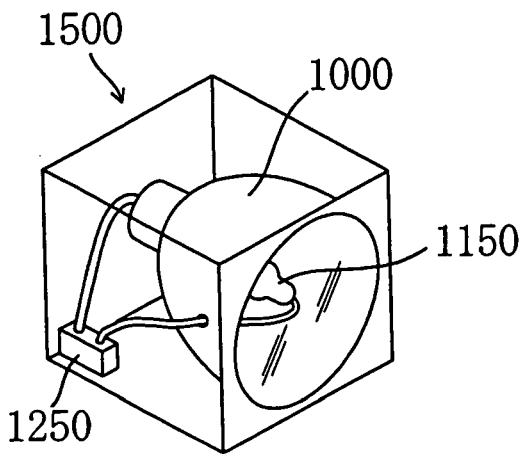
FIG. 9A is a perspective view schematically showing a configuration of the prior art lamp unit 1500.
Figure 9B:
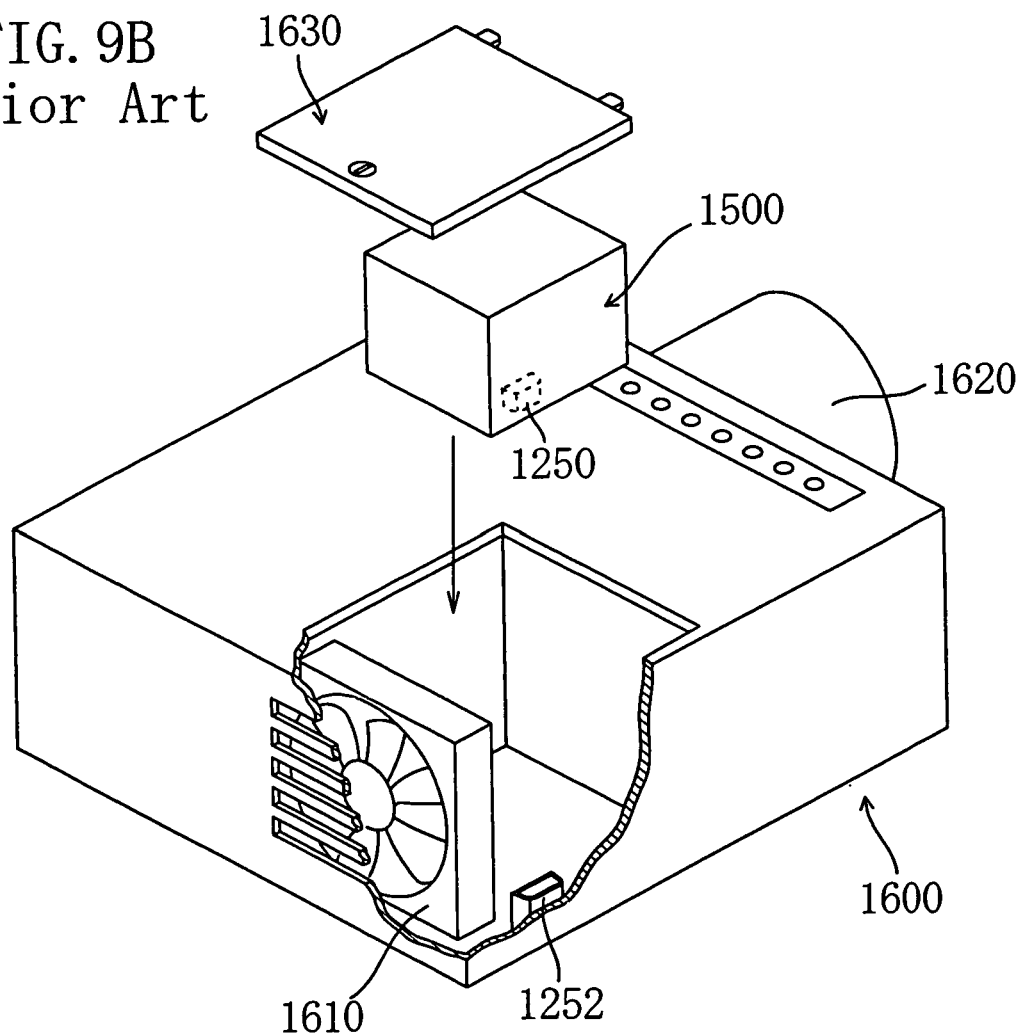
FIG. 9B is a cut-away perspective view schematically showing a configuration of a prior art projector body 1600.

If the reflecting-mirror-equipped lamp of the above embodiment and an optical system including an image element (e.g., a digital micromirror device (DMD) panel or a liquid crystal panel) are combined, image projecting apparatus (see FIG. 9) is obtained. For example, projectors (digital light processing (DLP) projectors) using DMDs or liquid crystal projectors (including reflective projectors using a liquid crystal on silicon (LCOS) structure) can be provided. Furthermore, the reflecting-mirror-equipped lamps of this embodiment can be used preferably, not only as a light source of image projecting apparatus, but also for other applications, such as a light source for ultraviolet ray steppers or a light source for sport stadium, a light source for automobile headlights, and a floodlight for illuminating traffic signs.

In a reflecting-mirror-equipped lamps according to the present invention, no base is attached to a first sealing portion fixed near a narrow opening of a reflecting mirror, and an external lead extending from the first sealing portion and an outward-drawn lead wire are joined to each other by the plastic flow of a caulking member. Accordingly, compactness and low cost are achieved, as well as connection reliability is secured.

What is claimed is:

1. A reflecting-mirror-equipped lamp comprising:
   a double end type high pressure discharge lamp including a luminous bulb enclosing a luminous material therein and first and second sealing portions respectively extending from both ends of the luminous bulb; and
   a reflecting mirror for reflecting light emitted from the high pressure discharge lamp,
   wherein the reflecting mirror includes a wide opening provided on a side of the reflecting mirror from which light is emitted and a narrow opening for fixing the high pressure discharge lamp,
   the first sealing portion of the high pressure discharge lamp is fixed near the narrow opening of the reflecting mirror, and no base is attached to the first sealing portion,
   the second sealing portion of the high pressure discharge lamp is disposed toward the wide opening of the reflecting mirror,
   the first sealing portion includes an external lead extending outward from the first sealing portion and exposed from the first sealing portion,
   part of the external lead extending from the first sealing portion and an outward-drawn lead wire electrically connected to an external circuit are joined to each other by the plastic flow of a caulking member, and
   the caulking member is surrounded and covered with cement.

2. The reflecting-mirror-equipped lamp of claim 1, wherein the caulking member is placed outside a space defined by a reflecting surface of the reflecting mirror.

3. The reflecting-mirror-equipped lamp of claim 1, wherein part of the first sealing portion is also covered with the cement.

4. The reflecting-mirror-equipped lamp of claim 1, wherein the discharge lamp is a high pressure mercury lamp including mercury enclosed in an amount of 150 mg/cm3 or more.

5. An image projecting apparatus comprising:
   the reflecting-mirror-equipped lamp recited in claim 1;
   a lamp house for holding the reflecting-mirror-equipped lamp; and
   an optical system using the reflecting-mirror-equipped lamp as a light source.

6. The image projecting apparatus of claim 5, wherein a high-pressure pulse for starting the lamp is input to a terminal provided at the external lead extending from the first sealing portion of the reflecting-mirror-equipped lamp.

7. A reflecting-mirror-equipped lamp comprising:
   a high pressure discharge lamp including a luminous bulb which encloses a luminous material therein and in which a pair of opposed electrodes is placed, and first and second sealing portions respectively extending from both ends of the luminous bulb; and
   a reflecting mirror for reflecting light emitted from the high pressure discharge lamp,
   wherein the reflecting mirror includes a wide opening provided on a side of the reflecting mirror from which light is emitted and a narrow opening for fixing the high pressure discharge lamp,
   the first sealing portion of the high pressure discharge lamp is fixed near the narrow opening of the reflecting mirror, and no base is attached to the first sealing portion,
   the second sealing portion of the high pressure discharge lamp is disposed toward the wide opening of the reflecting mirror,
   the first sealing portion seals a metal foil electrically connected to one of the electrodes at an end, and the other end of the metal foil is connected an external lead,
   part of the external lead is located inside the first sealing portion and the other part of the external lead extends outward from an end face of the first sealing portion,
   the part of the external lead extending from the first sealing portion and an outward-drawn lead wire electrically connected to an external circuit are joined to each other by the plastic flow of a caulking member, and
   part of the caulking member is buried in the first sealing portion.

8. The reflecting-mirror-equipped lamp of claim 7, wherein the caulking member is placed outside a space defined by a reflecting surface of the reflecting mirror.

9. The reflecting-mirror-equipped lamp of claim 7, wherein the caulking member is surrounded and covered with cement.

10. The reflecting-mirror-equipped lamp of claim 9, wherein part of the first sealing portion is also covered with the cement.

11. The reflecting-mirror-equipped lamp of claim 7, wherein the discharge lamp is a high pressure mercury lamp including mercury enclosed in an amount of 150 mg/cm3 or more.

12. An image projecting apparatus comprising:
    the reflecting-mirror-equipped lamp recited in claim 7;
    a lamp house for holding the reflecting-mirror-equipped lamp; and
    an optical system using the reflecting-mirror-equipped lamp as a light source.

13. The image projecting apparatus of claim 12, wherein a high-pressure pulse for starting the lamp is input to a terminal provided at the external lead extending from the first sealing portion of the reflecting-mirror-equipped lamp.

* * * * *

UNITED STATES PATENT AND TRADEMARK OFFICE
CERTIFICATE OF CORRECTION

| | | |
|---|---|---|
| PATENT NO. | : 6,997,579 B2 | Page 1 of 1 |
| APPLICATION NO. | : 10/685961 | |
| DATED | : February 14, 2006 | |
| INVENTOR(S) | : Makoto Horiuchi et al. | |

It is certified that error appears in the above-identified patent and that said Letters Patent is hereby corrected as shown below:

In the Claims:

Column 12

Line 20, Claim 7: after "connected" insert --to--

Signed and Sealed this

Twenty-first Day of November, 2006

JON W. DUDAS
*Director of the United States Patent and Trademark Office*